(12) United States Patent
Eppstein

(10) Patent No.: US 7,451,445 B1
(45) Date of Patent: Nov. 11, 2008

(54) MECHANISM FOR TRACKING THE EXECUTION PROGRESS OF A PARENT TASK WHICH SPAWNS ONE OR MORE CONCURRENTLY EXECUTING CHILD TASKS

(75) Inventor: Christopher M. Eppstein, Mountain View, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 825 days.

(21) Appl. No.: 10/812,572

(22) Filed: Mar. 29, 2004

(51) Int. Cl.
 *G06F 9/46* (2006.01)
(52) U.S. Cl. .................... 718/100; 718/102; 718/103
(58) Field of Classification Search ................ 715/772, 715/859; 718/100, 102–103
See application file for complete search history.

(56) References Cited

U.S. PATENT DOCUMENTS

| | | | | |
|---|---|---|---|---|
| 5,301,348 A * | 4/1994 | Jaaskelainen | ................ | 714/46 |
| 6,097,390 A * | 8/2000 | Marks | ......................... | 715/772 |
| 6,639,687 B1 * | 10/2003 | Neilsen | ...................... | 358/1.14 |
| 2001/0055017 A1 * | 12/2001 | Ording | ......................... | 345/440 |
| 2003/0005022 A1 * | 1/2003 | Brown | ......................... | 709/100 |
| 2005/0097480 A1 * | 5/2005 | Care | ........................... | 715/859 |

* cited by examiner

*Primary Examiner*—Meng-Ai An
*Assistant Examiner*—Kenneth Tang
(74) *Attorney, Agent, or Firm*—Bobby K. Truong; Hickman Palermo Truong & Becker LLP

(57) ABSTRACT

An improved mechanism for tracking the execution progress of a task is disclosed. In one implementation, the execution progress of a parent task and one or more child tasks is monitored. The parent task spawns the one or more child tasks, and the child tasks execute concurrently with the parent task. In addition to monitoring the execution progress of the tasks, an overall execution progress value is determined for the parent task. In one implementation, the overall execution progress value is determined based, at least partially, upon the execution progress of the parent task and the execution progress of at least one of the child tasks. By taking the execution progress of the child tasks into account, the overall execution progress value reflects not just the progress made by the parent task itself but also the progress made by the child tasks that it spawned.

21 Claims, 9 Drawing Sheets

TASK A

TASK A

TASK A

$TW_A = W_A = 100$
$TB_A = B_A = 99$

↓ SIGNAL COMPLETION $P_A = 1.00$

*Fig. 2C*

MECHANISM FOR TRACKING THE EXECUTION PROGRESS OF A PARENT TASK WHICH SPAWNS ONE OR MORE CONCURRENTLY EXECUTING CHILD TASKS

BACKGROUND

In some computer implementations, when a task is executing, a visual cue is provided to a user to show the user that the task is executing. An example of a visual cue is an iconic rendering of an hourglass or a clock, which indicates to the user that the task is running but has not yet completed. While this visual cue is somewhat informative, it does not provide any indication to the user as to how much progress has been made. Thus, the user is given no information with which to determine how long the task will take to complete.

In other computer implementations, the user is provided with more information. More specifically, while a task is executing, the user is provided with information that suggests the rate at which the task is progressing. As an example, information about the number of bytes that have been downloaded out of a total number of bytes to be downloaded can be presented. Similarly, a bar or meter may be shown that indicates the percentage of the task that has been completed. This information is updated as execution of the task progresses. Thus, with this information, the user can determine whether progress is being made by the task, and can approximate how much longer it will take to complete the task. In some implementations, the information presented to the user even specifies approximately how long it will take for the task to be completed.

In current implementations, task progress is tracked on an individual task-by-task basis. That is, the progress of each task is tracked separately, and the information provided to the user pertains only to that task. This works well when each task is its own individual self-contained task. However, if a task (a parent task) spawns other tasks (child tasks) that execute concurrently, and the completion of the parent task is somewhat dependent upon completion of the child tasks, then providing progress information for each individual task is not very helpful because it does not provide the user with a good indication of the overall progress being made. Consequently, for such scenarios, the current implementations are not very effective.

SUMMARY

In accordance with one embodiment of the present invention, there is provided an improved mechanism for tracking the execution progress of a task.

In one embodiment, the execution progress of a parent task and one or more child tasks is monitored. The parent task spawns the one or more child tasks, and the child tasks execute concurrently with the parent task. Because the parent task spawns the child tasks, completion of the parent task is somewhat dependent on the completion of the child tasks.

In addition to monitoring the execution progress of the tasks, an overall execution progress value is determined for the parent task. This value provides an indication as to how much overall progress has been made by the parent task. In one embodiment, the overall execution progress value is determined based, at least partially, upon the execution progress of the parent task and the execution progress of at least one (and in one embodiment, all) of the child tasks. By taking the execution progress of the child tasks into account, the overall execution progress value reflects not just the progress made by the parent task itself but also the progress made by the child tasks that it spawned. As a result, the overall execution progress value provides an indication of the overall progress being made by the parent task (including progress made by itself and progress made by its child tasks).

In one embodiment, the overall execution progress value is determined as follows. In one operation, a total weight for the parent task is determined. In one embodiment, the parent task has an associated weight, each child task has an associated declared weight, and the total weight for the parent task includes the weight of the parent task and the declared weight of each child task. Used in this context, the weight of a task represents an approximate amount of work that needs to be performed to complete that task.

In another operation, a ballast is determined for the parent task. The ballast is a portion of the weight of the parent task, and indicates how much execution progress has been made by the parent task itself.

In another operation, a calculated ballast is determined for each child task. The calculated ballast for a child task is a portion of the declared weight of that child task, and indicates how much execution progress has been made by that child task.

After the above quantities are determined, the overall execution progress value is derived based, at least partially, upon these quantities. In one embodiment, the overall execution progress value is derived by determining a ratio between a total ballast and the total weight, where the total ballast includes the ballast of the parent task and the calculated ballast of each child task. This ratio in effect indicates what percentage of the overall work that needs to be performed by the parent task and the child tasks has already been performed. Thus, it truly reflects the overall execution progress of the parent task, including the execution progress of the parent task itself and the execution progress of the child tasks.

BRIEF DESCRIPTION OF THE DRAWINGS

FIGS. 2A-2C illustrate an example in which an overall execution progress value is derived for a parent task having no child tasks, in accordance with one embodiment of the present invention.

DETAILED DESCRIPTION OF EMBODIMENT(S)

Conceptual Overview

Figure 1:
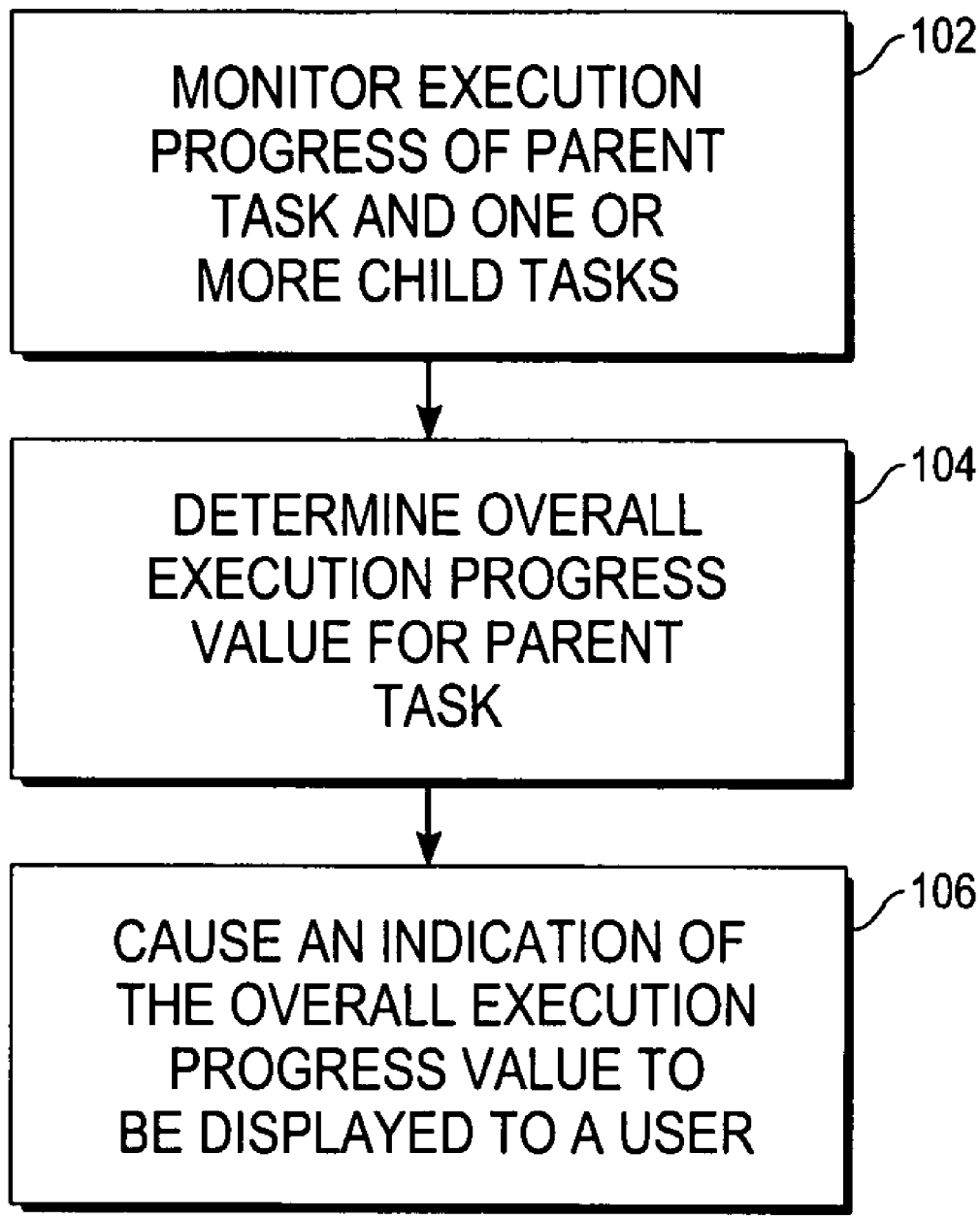
FIG. 1 is a flow diagram which provides a high-level overview of one embodiment of the present invention.

In accordance with one embodiment of the present invention, there is provided an improved mechanism for tracking the execution progress of a task. A flow diagram, which provides a high-level overview of some exemplary operations performed by this mechanism, is shown in FIG. 1. For purposes of the present invention, the operations shown in FIG. 1 may be performed by any type of mechanism. For example, the operations may be performed by a task manager executing on a general-purpose computer system (such as that shown in FIG. 7), where the task manager takes the form of one or more sets of computer code. Also, the operations may be performed by a hardware device (e.g. an ASIC) that has been constructed with the specific logic for performing the operations. These are just some examples of the possible implementations for the mechanism. All possible implementations are within the scope of the present invention.

As shown in FIG. 1, the mechanism tracks the progress of a parent task by monitoring (block 102) the execution progress of the parent task and one or more child tasks. The parent task spawns the one or more child tasks, and the child tasks execute concurrently with the parent task. Because the parent task spawns the child tasks, completion of the parent task is somewhat dependent on the completion of the child tasks. For purposes of the present invention, monitoring of the tasks may be performed in any desired manner. These include but not limited to active monitoring, where the mechanism actively checks on the execution progress of the tasks (e.g. on a periodic basis), and passive monitoring where the mechanism is informed of the execution progress of the tasks by some other mechanism (e.g. the tasks themselves).

In addition to monitoring the execution progress of the tasks, the mechanism also determines (block 104) an overall execution progress value for the parent task. In one embodiment, the overall execution progress value is determined based, at least partially, upon the execution progress of the parent task and the execution progress of at least one (and in one embodiment, all) of the child tasks. By taking the execution progress of the child tasks into account, the overall execution progress value reflects not just the progress made by the parent task itself but also the progress made by the child tasks that it spawned. As a result, the overall execution progress value provides an indication of the overall progress being made by the parent task (including progress made by itself and progress made by its child tasks).

After the overall execution progress value is determined, the mechanism optionally causes (block 106) an indication of the overall execution progress value to be displayed to a user. This indication may take on any desired form, including but not limited to a number indicating the percentage of the overall parent task that has been completed, and/or a bar or meter that graphically indicates the completion percentage to the user. The user is thus apprised of the overall progress being made by the parent task and its child tasks.

The above discussion provides a high-level overview of one embodiment of the present invention. This embodiment will be described in greater detail in the following sections.

Terminology

For ease and clarity of discussion, it is useful to introduce a number of terms and their definitions as used herein. These terms and definitions are presented below, and will be elaborated upon by way of examples in conjunction with FIGS. 2A-2C, 3A-3D, and 4A-4B in a later section.

The term "task" as used herein refers broadly to anything (such as, for example, a process) that performs work or requires work to be performed. During execution, a task can spawn one or more subtasks. In such a case, the task is referred to as a "parent task" and each subtask is referred to as a "child task" of the parent task. The parent task and the child tasks are separate tasks. However, completion of the parent task may be dependent upon completion of the child tasks; thus, the parent and child tasks are related. Each child task can also spawn its own child tasks. In such a case, the child task of the child task would be referred to as a "grandchild task" of the parent task. Each grandchild task may also spawn its own child tasks ("great grandchild tasks" of the parent task). Generally, any task can spawn one or more child tasks; thus, this task hierarchy can be extended to any depth. The term "descendant task" is used herein to refer to any task that is lower in a task hierarchy than a particular task. Thus, for example, in a hierarchy where a parent task spawns a child task, the child task spawns a grandchild task, the grandchild task spawns a great grandchild task, and so on, all of the tasks (child task, grandchild task, great grandchild task, and so on) below the parent task are descendant tasks of the parent task.

Each task has an associated "weight". The weight of a task represents an approximate amount of work that needs to be performed to complete that task. The weight of a task can be increased or decreased during execution to indicate the addition or removal of work to be performed by or for that task. As execution of a task progresses, work will be performed, and the approximate amount of work that has already been performed or completed is referred to as the "ballast". The ballast of a task is a portion of the weight of that task, and the ballast grows as more work is performed by or for the task. Thus, the ballast provides an indication as to how much execution progress has been made by that task.

Each child task of a parent task has an associated "declared weight". The declared weight is the weight of the child task as it appears to the parent task. In one embodiment, the declared weight is assigned by a programmer, although it could instead be automatically determined, for example, by software. The declared weight of a child task may be different from the actual weight of the child task. Put another way, a child task may have any actual weight, but from the perspective of the parent task, the weight of the child task is the declared weight. This will be made more clear when the examples in FIGS. 2A-2C, 3A-3D, and 4A-4B are discussed.

Each child task of a parent task has an associated "calculated ballast". The calculated ballast of a child task is the ballast of the child task as it appears to the parent task. The calculated ballast of a child task is a portion of the declared weight of that child task, and the calculated ballast grows as more work is performed by or for the child task. Thus, the calculated ballast of a child task provides an indication as to how much execution progress has been made by that child task. In one embodiment, the calculated ballast of a child task is the product of the declared weight of that child task and a progress value of that child task. The term "progress value" is defined below.

Each task has a "total ballast" and a "total weight". In one embodiment, the total ballast of a task is the sum of: (1) the ballast of that task; and (2) the calculated ballast of each of the child tasks (if any) of that task. Thus, for a parent task that spawns three child tasks, for example, the total ballast of the parent task is the sum of the ballast of the parent task and the calculated ballasts of the three child tasks. Similarly, in one embodiment, the total weight of a task is the sum of: (1) the weight of that task; and (2) the declared weight of each of the child tasks (if any) of that task. Thus, for the same parent task that spawns the three child tasks, for example, the total weight of the parent task is the sum of the weight of the parent task and the declared weights of the three child tasks.

In one embodiment, the "progress value" of a task is defined as the ratio between its total ballast and its total weight. This ratio may be derived in many ways, for example, by dividing the total ballast by the total weight, or by dividing the ballast and each calculated ballast by the total weight and adding the results. For a parent task, this ratio represents what percentage of the overall work that needs to be performed by the parent task and its child tasks has been performed. Thus, it reflects the overall execution progress of the parent task, including the execution progress of the parent task itself and the execution progress of the child tasks. Consequently, this ratio may be viewed as the overall execution progress value for the parent task.

In the above embodiment, the total ballast of a task is defined as including the ballast of that task and the calculated ballasts of its child tasks. The total ballast does not include any ballasts from any descendents of the child tasks (e.g. grandchild tasks, child tasks of the grandchild tasks, and so on). Likewise, the total weight of a task does not include any weights from any descendents of the child tasks. Thus, it would appear at first glance that the progress value of a task does not take into account the execution progress of any descendant tasks beyond the child tasks.

Recall, however, that the calculated ballast of a child task is the product of the declared weight of that child task and the progress value of that child task. Recall further that the progress value of a task takes into account the execution progress of that task as well as the execution progress of its child tasks. Thus, the calculated ballast of a child task does reflect the execution progress of its child tasks. It follows then that the progress value of the uppermost task reflects the execution progress of not just its child tasks but also the execution progress of descendants of its child tasks.

This can be seen more clearly if the task hierarchy is viewed as a tree, with each task represented as a node in the tree. The execution progress of a task at a lower part of the tree affects the progress value of its parent task. The execution progress of that parent task affects the progress value of its parent task. This effect propagates up the tree so that the progress value for even the highest task in the tree will reflect the execution progress of tasks many levels lower in the tree. Thus, even though the progress value of a task takes into account the calculated ballasts of just its child tasks, the progress value still reflects the execution progress of tasks even lower in the task hierarchy. Put another way, the progress value of a task reflects the execution progress of all of its descendant tasks.

It should be noted at this point that, if so desired, the ballasts and weights of other descendant tasks (e.g. grandchild tasks, child tasks of grandchild tasks, and so on) may be used to determine the progress value of a task. This and other modifications are within the scope of the present invention.

Determining an Overall Execution Progress Value

Figure 5:
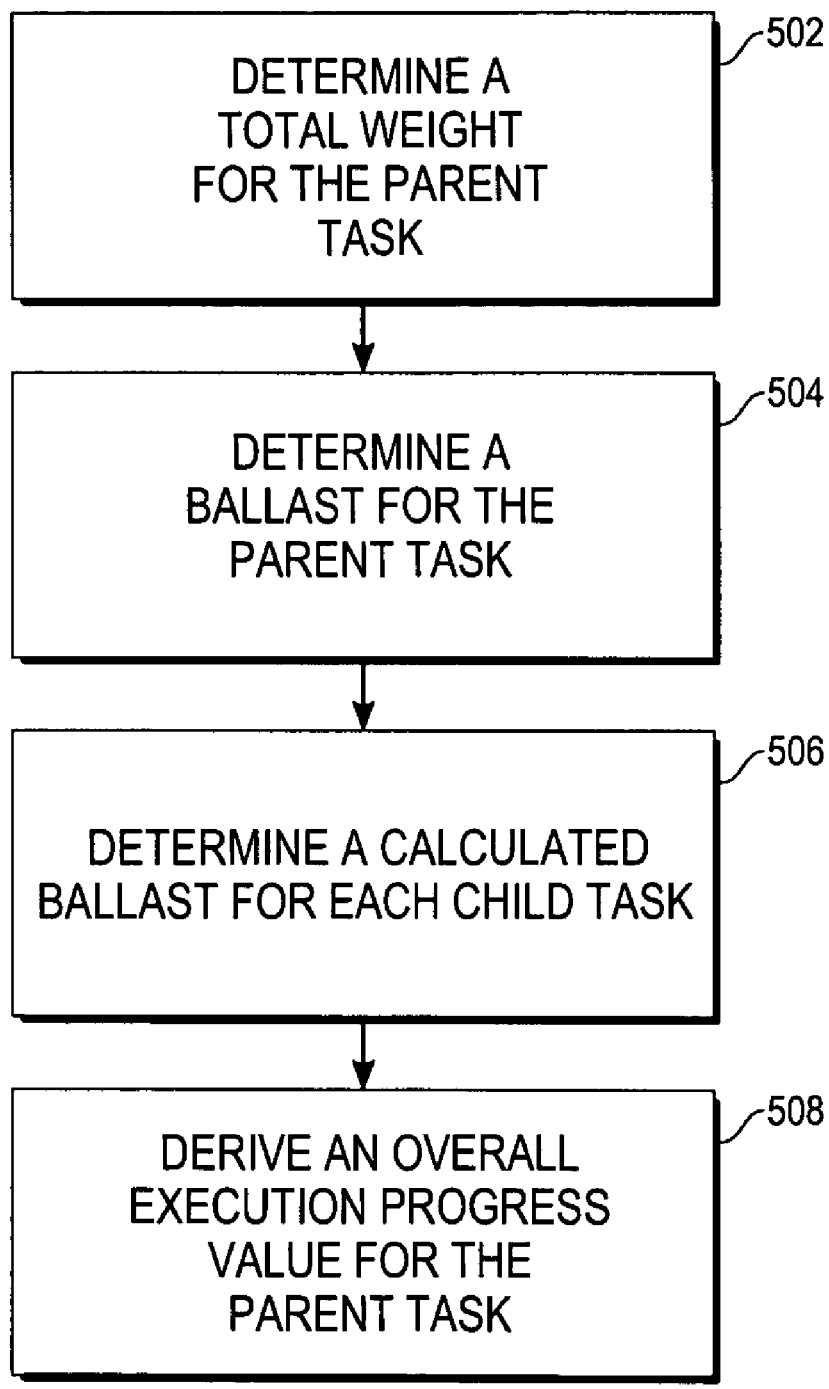
FIG. 5 is a flow diagram showing an exemplary method for determining an overall execution progress value for a parent task, in accordance with one embodiment of the present invention.

With the above discussion in mind, an embodiment of the present invention will now be described in greater detail with reference to FIG. 5. FIG. 5 is an operational flow diagram showing an exemplary method for determining an overall execution progress value for a parent task. The flow diagram of FIG. 5 is an elaboration of block 104 of FIG. 1. In the following discussion, for the sake of illustration, it will be assumed that the mechanism performing the operations of FIGS. 1 and 5 takes the form of a task manager executing on a general-purpose computer system, such as computer system 700 shown in FIG. 7. It will be further assumed that the task manager is cognizant of the relationships between tasks, the weights associated with tasks, and the progress that tasks are making toward completion. It will be further assumed that the parent class spawns one or more child tasks. Generally, the tasks may be performed on a single computer or on a number of different computers in a distributed network.

As shown in FIG. 5, the task manager determines an overall execution progress value for a parent task by determining (block 502) a total weight for the parent task. In one embodiment, the total weight of the parent class is the sum of the weight of the parent class and the declared weight of each of the child tasks.

The task manager further determines (block 504) a ballast for the parent task. The ballast is a portion of the weight of the parent class, and indicates how much execution progress has been made by the parent task itself. The ballast may be calculated by the task manager, or it may be provided to the task manager by another mechanism (e.g. the parent task itself).

The task manager further determines (block 506) a calculated ballast for each of the child tasks. The calculated ballast for a child task is a portion of the declared weight of that child task, and indicates how much execution progress has been made by that child task. In one embodiment, the calculated ballast for a child task is the product of the declared weight of that child task and a progress value of that child task. The task manager may determine the progress value of a child task in the manner previously described (e.g. by deriving the ratio between the total ballast of the child task and the total weight of the child task). To determine the progress value of a child class, the task manager may take into account the execution progress of tasks one or more levels down in a task hierarchy (i.e. the execution progress of grandchild tasks, child tasks of grandchild tasks, and so on), as previously discussed.

After the total weight, the ballast, and the calculated ballasts are determined, the task manager derives (block 508) an overall execution progress value for the parent task based, at least partially, upon these quantities. In one embodiment, the overall execution progress value is derived by determining the ratio between the total ballast of the parent task and the total weight of the parent task, where the total ballast of the parent task is the sum of the ballast of the parent task and the calculated ballast of each of the child tasks. Derived in this manner, the overall execution process value will reflect the overall execution progress of the parent task, including the execution progress of the parent task itself and the execution progress of the child tasks.

In one embodiment, in addition to the functionality described above, the task manager may further keep track of the completion of tasks. The task manager may also have the ability to handle failed tasks (e.g. tasks that do not complete). For example, the task manager can remove weights assigned to failed tasks, and assign new weights to existing tasks, so that current task status and execution progress of tasks are properly captured. This enables robust progress tracking even in the face of failed tasks.

Sample Operations

The embodiment of the present invention described above will now be elaborated upon by way of example in conjunction with FIGS. 2A-2C, 3A-3D and 4A-4B. FIG. 2A shows a task A that is assigned a weight of 100. In this example and in the other examples herein, a value of 100 is selected because it is readily translated into a percentage; however, the present invention is not so limited. In the example of FIG. 2A, task A does not have any child tasks, and so the total weight of task A is also equal to 100. Recall that ballast is an approximate measure of the amount of work completed by a task. Thus, at time zero (e.g., before execution of task A begins), the ballast of task A is zero. The progress value of a task is the ratio between that task's total ballast and its total weight, and so at time zero the progress value is also zero.

In FIG. 2B, some time has elapsed and task A has executed to a certain extent; in the example, task A has progressed approximately 40 percent toward completion. At this point in time, the ballast of task A is 40 and the progress value is the ratio of 40 to 100, or 0.40 (40 percent).

In FIG. 2C, more time has elapsed and task A has been completed. Generally, it would thus be expected that the ballast of task A would be equal to 100. However, in one embodiment, the ballast cannot be equal to the weight of the task. Any attempt to do this will result in the ballast being set to a value less than the weight of the task (e.g., the weight of the task minus one). Thus, in the example of FIG. 2C, the ballast of task A at completion is set to 99. This feature is included so that the progress of a task will not be 100 percent complete until the task stops executing. Once the completion of task A is signaled to the task manager, the progress value of task A is set to 1.00 (100 percent).

As the progress value is measured, it can be rendered in some manner so that the relative amounts of completed work and work remaining can be made visible to a user. Actual numbers, perhaps expressed as a fraction or percentage, can be displayed, for example. Alternatively, a graphic of some type, perhaps a meter or bar, can be used to visualize progress made and work remaining. The estimated time to completion can be extrapolated and also displayed.

Referring now to FIGS. 3A-3D, an example of a parent task (task A) that includes a number of child tasks (tasks B, C, D and E) is represented. Task A is assigned a weight (W) of 100.

Figure 3A:
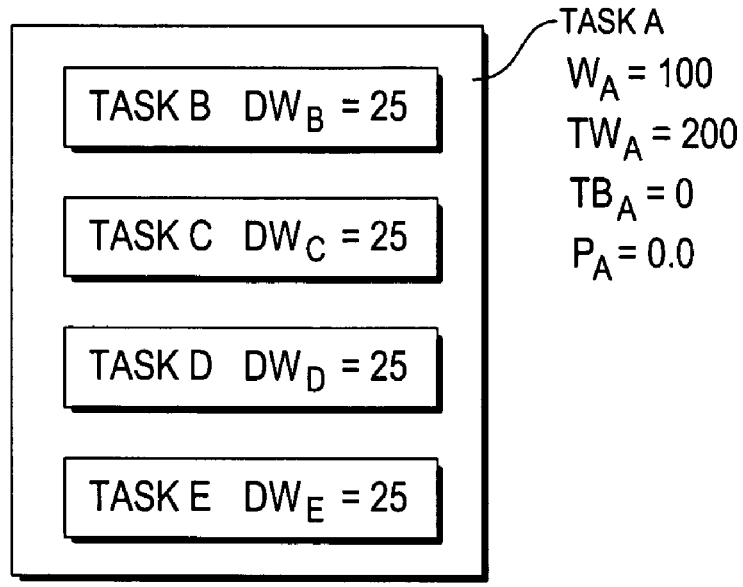
FIGS. 3A-3D illustrate an example in which an overall execution progress value is derived for a parent task that spawns a number of child tasks, in accordance with one embodiment of the present invention.

In the example of FIG. 3A, a declared weight (DW) is associated with each of the four child tasks B-E. The declared weight is the weight of the child task as it appears to the parent task (task A). In the example of FIG. 3A, each of the child tasks B-E is assigned an equal declared weight of 25. However, the present invention is not limited to the use of equal values for the declared weights.

Figure 3B:
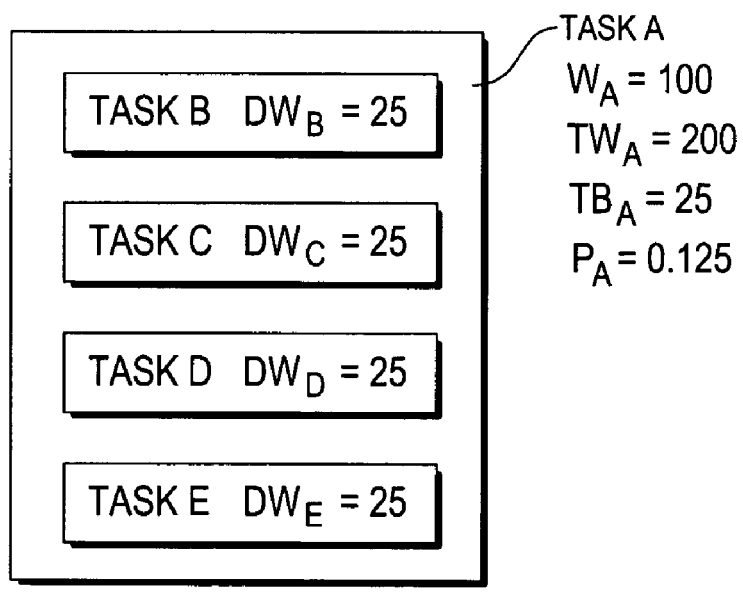
Figure 3C:
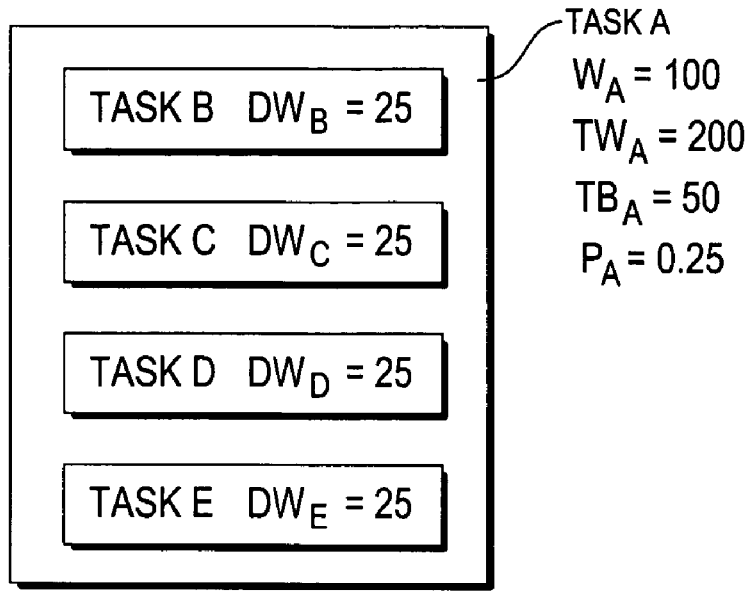
Figure 3D:
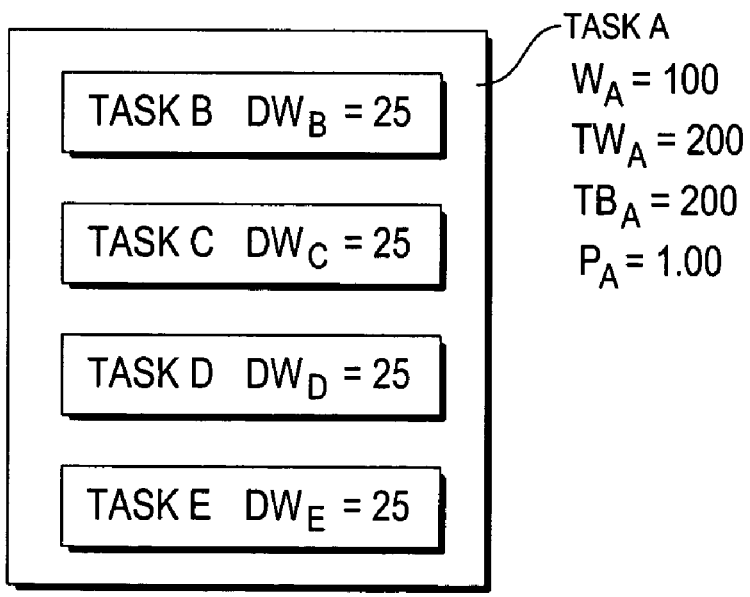

In the example of FIG. 3A, the total weight (TW) of task A is 200 (the weight of task A itself plus the declared weights of tasks B-E). During execution, the progress value for task A, which is initially zero, is updated as the execution of each of the child tasks B-E progresses. Recall that the progress value for a task is the ratio between the total ballast of that task and the total weight of that task. Upon completion of child task B, the total ballast (TB) increases to 25 (FIG. 3B). The progress value of task A is then the ratio of 25 to 200, or 0.125 (12.5 percent). Upon completion of another child task (e.g., task C), the total ballast is again increased, and the progress value of task A is updated accordingly (FIG. 3C). When all child tasks B-E are completed, the progress value of task A will be 0.50 (50 percent). When task A itself is completed (FIG. 3D), the progress value will be 1.00 (100 percent).

In order to simplify the description of the example of FIGS. 3A-3D, the tasks are described as executing serially, and updates of the progress value are made when a task is completed. However, the present invention is not so limited. That is, tasks can be performed and executed in any order or in parallel (i.e. concurrently). Also, updates can occur before tasks are completed, as presented by the example of FIGS. 2A-2C.

Figure 4A:
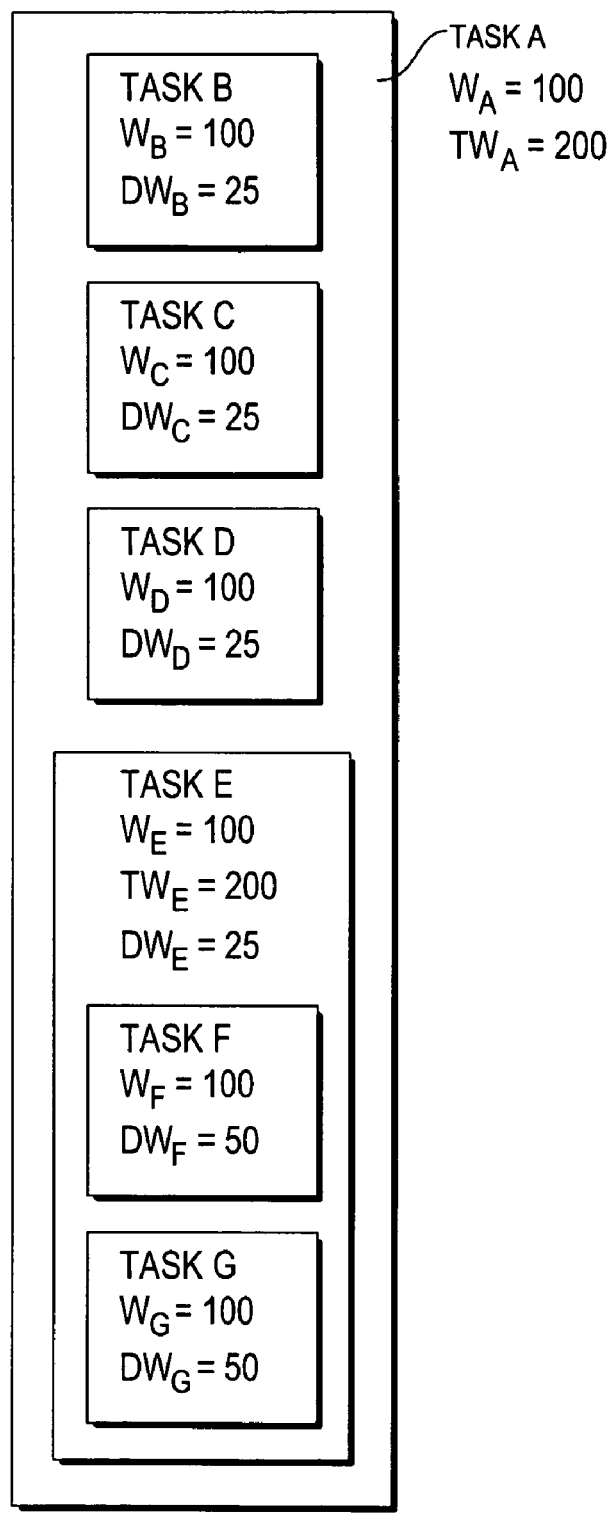
FIGS. 4A-4B illustrate an example in which an overall execution progress value is calculated for a parent task that spawns a number of child tasks, one of which in turn spawns a number of child tasks, in accordance with one embodiment of the present invention.

FIG. 4A illustrates an example in which a parent task A spawns child tasks B, C, D and E, and child task E spawns grandchild tasks F and G. As in the examples above, task A itself is assigned a weight of 100. Child tasks B, C, D, and E are also each assigned weights of 100. However, the declared weights of child tasks B, C, D and E (that is, the weight of these tasks from the perspective of their parent task, task A) is each set to 25. Thus, the total weight of task A is sum of the weight of task A itself and the declared weights of its child tasks (e.g., tasks B-E), or 200.

In the example of FIG. 4A, the assigned weights of child task E and grandchild tasks F and G are also each 100. However, the declared weights of grandchild tasks F and G (that is, the weight of these tasks from the perspective of their parent task, task E) is each set to 50. Thus, the total weight of child task E is sum of the weight of child task E itself and the declared weights of its child tasks (e.g., grandchild tasks F and G), or 200. Note, however, that the declared weight of child task E (as seen by task A) remains 25.

In the example of FIG. 4A, the task structure has been created but no progress has been made toward completing any of the tasks. Thus, the ballast associated with each of the tasks A-G is zero. However, task A may consider the set up of the task structure to be part of its workload, and so at this point, task A may have a non-zero ballast. That is, in setting up the task structure, task A may have completed a portion of its work, and this would be reflected in the ballast value for task A.

In general, the progress value (P) of a task 'i' is the ratio of its total ballast (TB) to its total weight (TW):

$$P_i = (TB_i)/(TW_i).$$

The total weight of task 'i' is the sum of its weight (W) and the summation of the declared weights (DWs) of its child tasks 'j':

$$TW_i = W_i + \Sigma(DW_j),$$

where j=1, 2, . . . , N. At any point in time, the total ballast of a task 'i' is the sum of its ballast (B) at that time and the summation of the calculated ballasts (CB) of its child tasks 'j' at that time:

$$TB_i = B_i + \Sigma(CB_j),$$

where j=1, 2, . . . , N and where $CB_j$ is the calculated ballast of task 'j' (recall that the calculated ballast of a task 'j' is the product of the progress value of task 'j' multiplied by the declared weight of task 'j'; $CB_j = P_j \times DW_j$, where $P_j = B_j/W_j$.).

Thus, in the example of FIG. 4A, the progress value of task A is:

$$P_A = (TB_A)/(TW_A); \tag{1}$$

$$TW_A = W_A + (DW_B + DW_C + DW_D + DW_E); \tag{2}$$

$$TB_A = B_A + (CB_B + CB_C + CB_D + CB_E); \tag{3}$$

$$CB_B = P_B \times DW_B, P_B = B_B/W_B; \tag{4}$$

$$CB_C = P_C \times DW_C, P_C = B_C/W_C; \tag{5}$$

$$CB_D = P_D \times DW_D, P_D = B_D/W_D; \text{ and} \tag{6}$$

$$CB_E = P_E \times DW_E, P_E = B_E/W_E. \tag{7}$$

However, note that child task E has child tasks (grandchild tasks F and G), and so the progress value of child task E is dependent on the execution progress of grandchild tasks F and G in much the same way that the progress value of task A is dependent on the execution progress of child tasks B-E. That is, $$P_E=(TB_E)/(TW_E); \quad (8)$$

$$TW_E=W_E+(DW_F+DW_G); \quad (9)$$

$$TB_E=B_E+(CB_F+CB_G); \quad (10)$$

$$CB_F=P_F \times DW_F, P_F=B_F/W_F; \text{ and} \quad (11)$$

$$CB_G=P_G \times DW_G, P_G=B_G/W_G. \quad (12)$$

Note that for a case in which task A has only one child task—task E, for example—and in which that child task has only one child task—task F, for example—then:

$$P_A=(B_A+P_E \times DW_E)/(W_A+DW_E); \text{ and} \quad (13)$$

$$P_E=(B_E+P_F \times DW_F)/(W_E+DW_F), P_F=B_F/W_F. \quad (14)$$

The extension of the example of FIG. 4A to other situations in which task A spawns tasks in addition to tasks B-E is accomplished by including terms for those additional tasks to equations (1)-(3) as appropriate. Similarly, the extension of example of FIG. 4A to other situations in which child task E spawns child tasks in addition to grandchild tasks F and G is accomplished by including terms for those additional tasks to equations (8)-(10) as appropriate. Also, the extension of the features to the present invention to situations in which additional levels of tasks are spawned (e.g., grandchild task G spawns a task or tasks that in turn spawn a task or tasks) can be accomplished by applying the examples described above at each successive level.

Figure 4B:
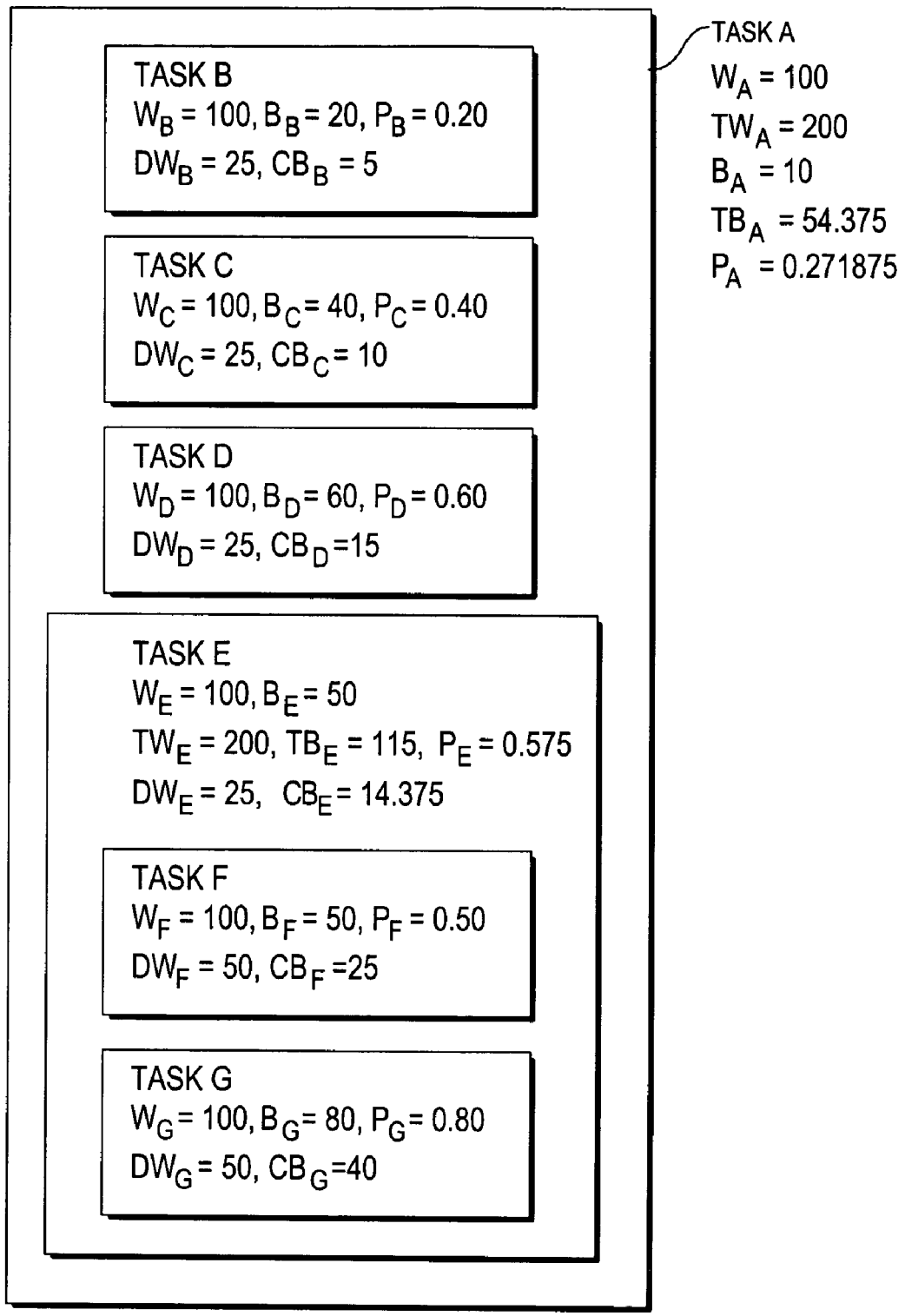

The example of FIG. 4B shows the task structure of FIG. 4A after some time has passed. The tasks A-G are at various levels of completion. Grandchild task G, for example, has a ballast of 80 and an assigned weight of 100, and so grandchild task G has a progress value of 0.80 (80/100). The declared weight of grandchild task G is 50, so the calculated ballast for grandchild task G is 40 (0.80×50). In a similar fashion, the calculated ballast for grandchild task F is 25. Child task E itself has a ballast of 50, and so the total ballast for child task E is 115 (the sum of its ballast and the calculated ballasts of grandchild tasks F and G). Child task E has an assigned weight of 100, and thus a total weight of 200 (the weight of child task E itself plus the declared weights of grandchild tasks F and G). Thus, the progress value of child task E is 115/200, or 0.575.

The declared weight of child task E is 25, and so the calculated ballast for child task E is 14.375 (25×0.575). Child task D has a ballast of 60 and an assigned weight of 100, and so child task D has a progress value of 0.60 (60/100). The declared weight of child task D is 25, so the calculated ballast for child task D is 15 (0.60×25). In a similar manner, child tasks B and C have progress values of 0.20 and 0.40, respectively, and calculated ballasts of 5 and 10, respectively.

Task A itself has a ballast of 10, and so the total ballast for task A is 54.375 (the sum of its ballast and the calculated ballasts of child tasks B, C, D and E). Task A has an assigned weight of 100, and thus a total weight of 200 (the weight of task A itself plus the declared weights of child tasks B, C, D and E). Thus, the progress value (also referred to as the overall execution progress value) of task A is 54.375/200, or 0.271875.

In one embodiment, when there is a change in ballast or total weight (e.g., the ballast of task A is increased, or the calculated ballast of grandchild task F is increased, or a new child task is spawned), then the overall execution progress value is automatically recalculated. Alternatively, the overall execution progress value is calculated "on demand." For example, at periodic intervals, a command (or something similar in function to a command) can be issued by the task manager to refresh values, causing the overall execution progress value to be updated.

Figure 6:
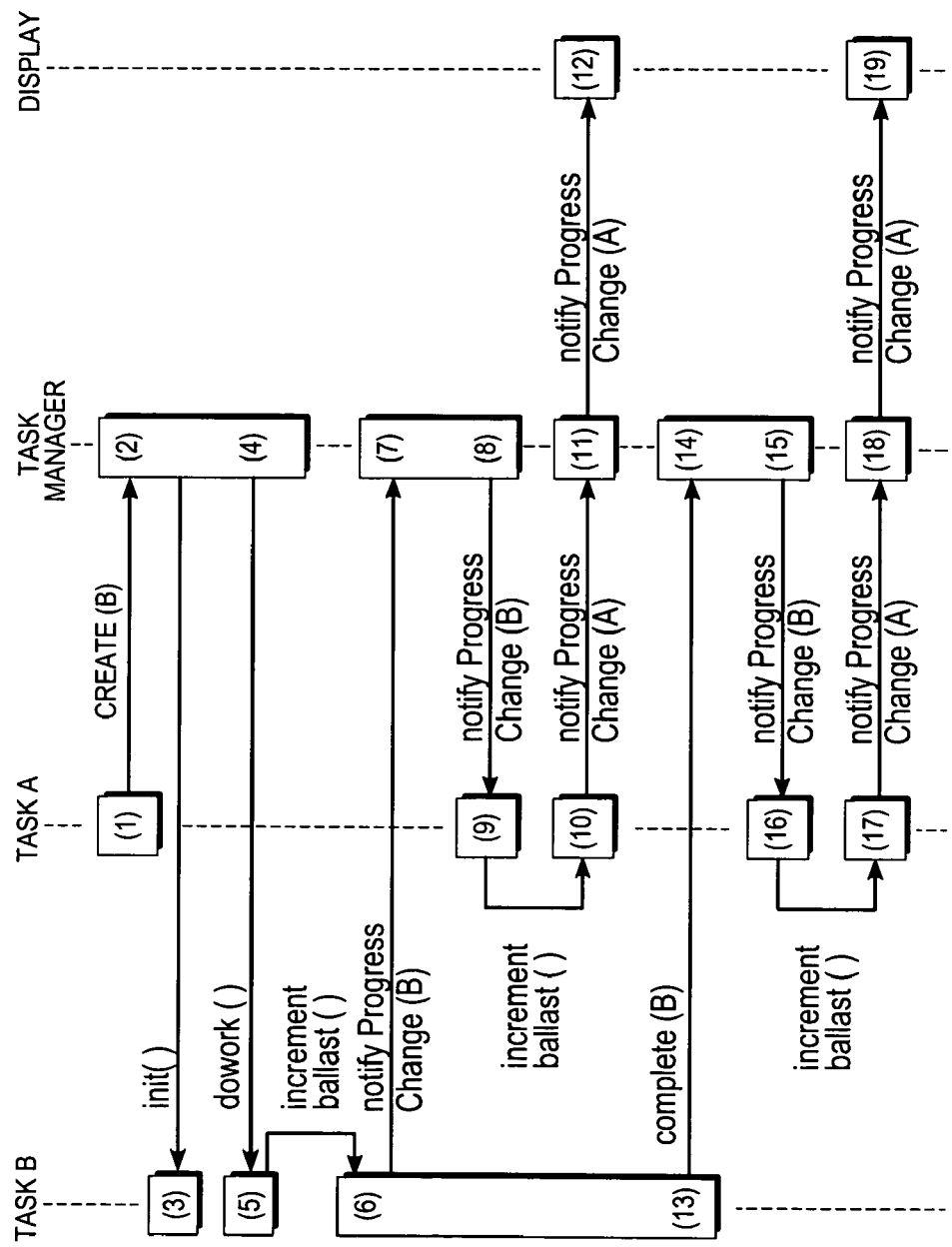
FIG. 6 is a flow diagram showing the interaction between a task manager and a number of tasks, in accordance with one embodiment of the present invention.

FIG. 6 is a flow diagram showing the interaction between a task manager and a number of tasks according to an embodiment of the present invention. At (1), task A spawns a task B, under management of the task manager. At (2) and (3), the task manager initializes task B, assigning a declared weight to task B. At (4) and (5), the task manager directs task B to begin working. From (5) to (6), task B advances some amount toward completion, and its ballast is incremented accordingly. At (6) and (7), either in response to a command from the task manager, or in response to the progress made by task B and the consequent incrementing of task B's ballast, the task manager is notified of the change in execution progress of task B.

At (8), the task manager notifies task A of the updated progress of task B. From (9) to (10), task A increments some amount toward completion, and its ballast is incremented accordingly. At (10), task A derives an updated progress value for itself, which takes into account the execution progress of task A as well as the execution progress of the child task B. At (10) and (11), the task manager is notified of the change in progress value for task A. At (11) and (12), the task manager notifies all observers of task A of the updated progress value for task A. One of these observers may be a display mechanism; thus, the updated progress value for task A is caused to be displayed to a user.

At (13), task B is completed and the task manager is notified of this at (14). At (15), the task manager notifies task A of the completion of task B. From (16) to (17), task A increments its overall ballast to reflect the completion of task B. It also updates its progress value in view of the updated overall ballast. At (17) and (18), the task manager is notified of the updated progress value for task A. At (18) and (19), the task manager notifies all observers of task A of the updated progress value for task A. One of these observers may be a display mechanism; thus, the updated progress value for task A is caused to be displayed to a user.

Hardware Overview

Figure 7:
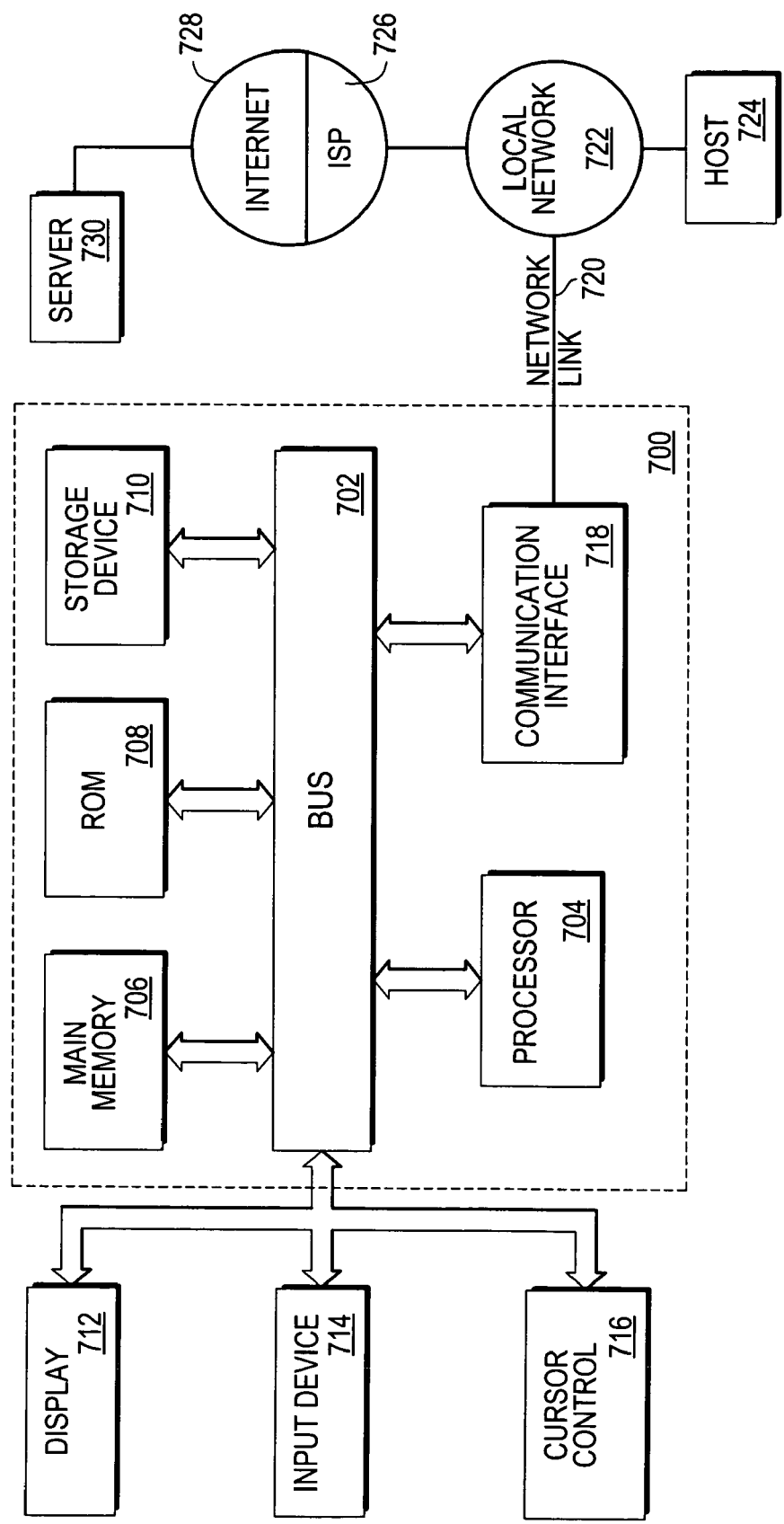
FIG. 7 is a block diagram of a general-purpose computer system in which one embodiment of the present invention may be implemented.

FIG. 7 is a block diagram that illustrates a computer system 700 upon which an embodiment of the invention may be implemented. Computer system 700 includes a bus 702 for facilitating information exchange, and one or more processors 704 coupled with bus 702 for processing information. Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions by processor 704. Computer system 700 may further include a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

In computer system 700, bus 702 may be any mechanism and/or medium that enables information, signals, data, etc., to be exchanged between the various components. For example, bus 702 may be a set of conductors that carries electrical signals. Bus 702 may also be a wireless medium (e.g. air) that carries wireless signals between one or more of the components. Bus 702 may also be a medium (e.g. air) that enables signals to be capacitively exchanged between one or more of the components. Bus 702 may further be a network connection that connects one or more of the components. Overall, any mechanism and/or medium that enables information, signals, data, etc., to be exchanged between the various components may be used as bus 702.

Bus 702 may also be a combination of these mechanisms/media. For example, processor 704 may communicate with storage device 710 wirelessly. In such a case, the bus 702, from the standpoint of processor 704 and storage device 710, would be a wireless medium, such as air. Further, processor 704 may communicate with ROM 708 capacitively. In this instance, the bus 702 would be the medium (such as air) that enables this capacitive communication to take place. Further, processor 704 may communicate with main memory 706 via a network connection. In this case, the bus 702 would be the network connection. Further, processor 704 may communicate with display 712 via a set of conductors. In this instance, the bus 702 would be the set of conductors. Thus, depending upon how the various components communicate with each other, bus 702 may take on different forms. Bus 702, as shown in FIG. 7, functionally represents all of the mechanisms and/or media that enable information, signals, data, etc., to be exchanged between the various components.

One embodiment of the invention is related to the use of computer system 700 for implementing the techniques described herein. According to one embodiment of the invention, those techniques are performed by computer system 700 in response to processor 704 executing one or more sequences of one or more instructions contained in main memory 706. Such instructions may be read into main memory 706 from another machine-readable medium, such as storage device 710. Execution of the sequences of instructions contained in main memory 706 causes processor 704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 700, various machine-readable media are involved, for example, in providing instructions to processor 704 for execution. Such a medium may take many forms, including but not limited to, non-volatile media, volatile media, and transmission media. Non-volatile media includes, for example, optical or magnetic disks, such as storage device 710. Volatile media includes dynamic memory, such as main memory 706. Transmission media includes coaxial cables, copper wire and fiber optics, including the wires that comprise bus 702. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 704 for execution. For example, the instructions may initially be carried on a magnetic disk of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are exemplary forms of carrier waves transporting the information.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution. In this manner, computer system 700 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the issued claims.

What is claimed is:

1. A machine-implemented method, comprising:
   monitoring execution progress of a parent task and one or more child tasks, wherein the one or more child tasks are spawned by the parent task and execute concurrently with the parent task, and wherein each of the child tasks is a separate task from the parent task;
   determining an overall execution progress value for the parent task, wherein weight represents an approximate amount of work that needs to be performed to complete a task, and wherein determining the overall progress value comprises:
      determining a total weight for the parent task, wherein the parent task has an associated weight and each child task has an associated declared weight, and wherein the total weight includes the weight of the parent task and the declared weight of each child task;
      determining a ballast for the parent task, wherein the ballast is a portion of the weight of the parent task and indicates how much execution progress has been made by the parent task;
      determining a calculated ballast for each child task, wherein the calculated ballast for a child task is a portion of the declared weight of the child task and indicates how much execution progress has been made by the child task; and
      deriving the overall execution progress value for the parent task based, at least partially, upon the total weight, the ballast of the parent task, and the calculated ballast of at least one of the child tasks; and
   causing an indication of the overall execution progress value to be displayed to a user.

2. The method of claim 1, wherein deriving the overall execution progress value comprises:
   determining a ratio between a total ballast and the total weight, wherein the total ballast includes the ballast of the parent task and the calculated ballast of each child task.

3. The method of claim 1, wherein determining a calculated ballast for each child task comprises:
   determining a progress value for a particular child task; and
   determining a calculated ballast for the particular child task, wherein the calculated ballast for the particular child task is the product of the progress value for the particular child task and a declared weight of the particular child task.

4. The method of claim 3, wherein the particular child task spawns one or more grandchild tasks which run concurrently with the particular child task, and wherein the progress value for the particular child task is determined based, at least partially, upon execution progress of the particular child task and execution progress of at least one of the grandchild tasks.

5. The method of claim 1, wherein the total weight does not include weights of any tasks spawned by the one or more child tasks.

6. A machine-readable storage medium, comprising:
   instructions for causing one or more processors to monitor execution progress of a parent task and one or more child tasks, wherein the one or more child tasks are spawned by the parent task and execute concurrently with the parent task, and wherein each of the child tasks is a separate task from the parent task;
   instructions for causing one or more processors to determine an overall execution progress value for the parent task, wherein weight represents an approximate amount of work that needs to be performed to complete a task, and wherein the instructions for causing one or more processors to determine the overall execution progress value comprise:
      instructions for causing one or more processors to determine a total weight for the parent task, wherein the parent task has an associated weight and each child task has an associated declared weight, and wherein the total weight includes the weight of the parent task and the declared weight of each child task;
      instructions for causing one or more processors to determine a ballast for the parent task, wherein the ballast is a portion of the weight of the parent task and indicates how much execution progress has been made by the parent task;
      instructions for causing one or more processors to determine a calculated ballast for each child task, wherein the calculated ballast for a child task is a portion of the declared weight of the child task and indicates how much execution progress has been made by the child task; and
      instructions for causing one or more processors to derive the overall execution progress value for the parent task based, at least partially, upon the total weight, the ballast of the parent task, and the calculated ballast of at least one of the child tasks; and
   instructions for causing one or more processors to cause an indication of the overall execution progress value to be displayed to a user.

7. The machine-readable storage medium of claim 6, wherein the instructions for causing one or more processors to derive the overall execution progress value comprises:
   instructions for causing one or more processors to determine a ratio between a total ballast and the total weight, wherein the total ballast includes the ballast of the parent task and the calculated ballast of each child task.

8. The machine-readable storage medium of claim 6, wherein the instructions for causing one or more processors to determine a calculated ballast for each child task comprises:
   instructions for causing one or more processors to determine a progress value for a particular child task; and
   instructions for causing one or more processors to determine a calculated ballast for the particular child task, wherein the calculated ballast for the particular child task is the product of the progress value for the particular child task and a declared weight of the particular child task.

9. The machine-readable storage medium of claim 8, wherein the particular child task spawns one or more grandchild tasks which run concurrently with the particular child task, and wherein the progress value for the particular child task is determined based, at least partially, upon execution progress of the particular child task and execution progress of at least one of the grandchild tasks.

10. The machine-readable storage medium of claim 6, wherein the total weight does not include weights of any tasks spawned by the one or more child tasks.

11. An apparatus having one or more processors, comprising:

a mechanism for monitoring execution progress of a parent task and one or more child tasks, wherein the one or more child tasks are spawned by the parent task and execute concurrently with the parent task, and wherein each of the child tasks is a separate task from the parent task;

a mechanism for determining an overall execution progress value for the parent task, wherein weight represents an approximate amount of work that needs to be performed to complete a task, and wherein the mechanism for determining the overall execution progress value for the parent task comprises:

a mechanism for determining a total weight for the parent task, wherein the parent task has an associated weight and each child task has an associated declared weight, and wherein the total weight includes the weight of the parent task and the declared weight of each child task;

a mechanism for determining a ballast for the parent task, wherein the ballast is a portion of the weight of the parent task and indicates how much execution progress has been made by the parent task;

a mechanism for determining a calculated ballast for each child task, wherein the calculated ballast for a child task is a portion of the declared weight of the child task and indicates how much execution progress has been made by the child task; and a mechanism for deriving the overall execution progress value for the parent task based, at least partially, upon the total weight, the ballast of the parent task, and the calculated ballast of at least one of the child tasks; and a mechanism for causing an indication of the overall execution progress value to be displayed to a user.

12. The apparatus of claim 11, wherein the mechanism for deriving the overall execution progress value comprises:

a mechanism for determining a ratio between a total ballast and the total weight, wherein the total ballast includes the ballast of the parent task and the calculated ballast of each child task.

13. The apparatus of claim 11, wherein the mechanism for determining a calculated ballast for each child task comprises:

a mechanism for determining a progress value for a particular child task; and a mechanism for determining a calculated ballast for the particular child task, wherein the calculated ballast for the particular child task is the product of the progress value for the particular child task and a declared weight of the particular child task.

14. The apparatus of claim 13, wherein the particular child task spawns one or more grandchild tasks which run concurrently with the particular child task, and wherein the progress value for the particular child task is determined based, at least partially, upon execution progress of the particular child task and execution progress of at least one of the grandchild tasks.

15. The apparatus of claim 11, wherein the total weight does not include weights of any tasks spawned by the one or more child tasks.

16. A machine-implemented method, comprising:

monitoring execution progress of a parent task, a child task, and a grandchild task, wherein the child task is spawned by the parent task and the grandchild task is spawned by the child task, wherein the child task and the grandchild task are separate tasks from the parent task, and wherein the child task and grandchild task execute concurrently with the parent task;

determining an overall execution progress value for the parent task, comprising:

determining a progress value for the grandchild task;

determining a progress value for the child task based, at least partially, on the progress value for the grandchild task; and determining the overall execution progress value for the parent task based, at least partially, on the progress value of the child task; and causing an indication of the overall execution progress value to be displayed to a user.

17. The method of claim 16, wherein the grandchild task spawns a great grandchild task, wherein determining the overall execution progress value for the parent task further comprises:

determining a progress value for the great grandchild task; and wherein the progress value for the grandchild task is determined based, at least partially, on the progress value for the great grandchild task.

18. A machine-readable storage medium, comprising:

instructions for causing one or more processors to monitor execution progress of a parent task, a child task, and a grandchild task, wherein the child task is spawned by the parent task and the grandchild task is spawned by the child task, wherein the child task and the grandchild task are separate tasks from the parent task, and wherein the child task and grandchild task execute concurrently with the parent task;

instructions for causing one or more processors to determine an overall execution progress value for the parent task, comprising:

instructions for causing one or more processors to determine a progress value for the grandchild task;

instructions for causing one or more processors to determine a progress value for the child task based, at least partially, on the progress value for the grandchild task; and instructions for causing one or more processors to determine the overall execution progress value for the parent task based, at least partially, on the progress value of the child task; and instructions for causing one or more processors to cause an indication of the overall execution progress value to be displayed to a user.

19. The machine-readable storage medium of claim 18, wherein the grandchild task spawns a great grandchild task, wherein the instructions for causing one or more processors to determine the overall execution progress value for the parent task further comprises:

instructions for causing one or more processors to determine a progress value for the great grandchild task; and wherein the progress value for the grandchild task is determined based, at least partially, on the progress value for the great grandchild task.

20. An apparatus having one or more processors, comprising:

a mechanism for monitoring execution progress of a parent task, a child task, and a grandchild task, wherein the child task is spawned by the parent task and the grandchild task is spawned by the child task, wherein the child task and the grandchild task are separate tasks from the parent task, and wherein the child task and grandchild task execute concurrently with the parent task;

a mechanism for determining an overall execution progress value for the parent task, comprising:

a mechanism for determining a progress value for the grandchild task;

a mechanism for determining a progress value for the child task based, at least partially, on the progress value for the grandchild task; and a mechanism for determining the overall execution progress value for the parent task based, at least partially, on the progress value of the child task; and a mechanism for causing an indication of the overall execution progress value to be displayed to a user.

21. The apparatus of claim 20, wherein the grandchild task spawns a great grandchild task, wherein the mechanism for determining the overall execution progress value for the parent task further comprises:

a mechanism for determining a progress value for the great grandchild task; and wherein the progress value for the grandchild task is determined based, at least partially, on the progress value for the great grandchild task.

* * * * *